（12） United States Patent
Yang et al.

(10) Patent No.: US 7,801,546 B2
(45) Date of Patent: Sep. 21, 2010

(54) DISTRIBUTING CONFIGURATION PARAMETERS IN A HIGH DENSITY NETWORK

(75) Inventors: Sheausong Yang, Saratoga, CA (US);
Timothy Olson, San Jose, CA (US);
John Stratigakis, Medina, OH (US);
Richard Rebo, North Royalton, OH (US)

(73) Assignee: Cisco Technology, Inc., San Jose, CA (US)

( * ) Notice: Subject to any disclaimer, the term of this patent is extended or adjusted under 35 U.S.C. 154(b) by 980 days.

(21) Appl. No.: 11/235,560

(22) Filed: Sep. 26, 2005

(65) Prior Publication Data
US 2007/0072638 A1 Mar. 29, 2007

(51) Int. Cl.
*H04W 52/04* (2009.01)
*H04B 17/00* (2006.01)
(52) U.S. Cl. ............... 455/522; 455/67.11; 455/69; 455/70
(58) Field of Classification Search ........... 455/522
See application file for complete search history.

(56) References Cited

U.S. PATENT DOCUMENTS

| 5,157,709 | A | 10/1992 | Ohteru |
| 2005/0143119 | A1 | 6/2005 | Chandra et al. |
| 2006/0253736 | A1* | 11/2006 | Rudolf et al. ............... 714/12 |
| 2006/0264229 | A1* | 11/2006 | Guo et al. ............... 455/522 |

OTHER PUBLICATIONS

PCT International Search Report, International Application No. PCT/US06/21956, Oct. 26, 2007.

\* cited by examiner

*Primary Examiner*—Philip J Sobutka
(74) *Attorney, Agent, or Firm*—Tucker Ellis & West LLP

(57) ABSTRACT

A set of new information elements are defined that are to be used between an access point and a client that allow an access point to advertise its capabilities, configuration, and/or parameters allowing the client to tune to the parameters prior to, during, or after associating with the access point. If the access point adjusts these parameters, the changes are advertised in subsequent beacons and response frames and the client responsive to receiving a beacon or response frame with changed parameters will change its parameters accordingly. If the station changes its operating parameters it will send a message to the access point informing the access point of the changes.

18 Claims, 5 Drawing Sheets

DISTRIBUTING CONFIGURATION PARAMETERS IN A HIGH DENSITY NETWORK

CROSS-REFERENCE TO RELATED APPLICATIONS

This application related to U.S. Application No. 11,187,305, which is a continuation-in-part of U.S. application Ser. No. 10/977,284, filed on Oct. 29, 2004, which claims the benefit of priority of U.S. Provisional Application No. 60/604,269 filed Aug. 25, 2004, all of which are assigned to Cisco Technology, Inc., the assignee of this application and are hereby incorporated herein by reference.

BACKGROUND OF THE INVENTION

The present invention relates generally to wireless networks and more specifically to a protocol between infrastructure nodes and wireless clients to enhance the operation of a High Density Wireless Local Area Network (HD WLAN).

The IEEE 802.11 Standard is well established and provides the Physical Layer (PHY) and Medium Access Control Layer (MAC) specifications for fixed, portable, and moving stations requiring wireless connectivity within a local area. Included in the Standard are several PHY radio parameters that help define the radio frequency (RF) range of a BSS (cell). Included within these parameters are Transmit Power, Receive Sensitivity, and Clear Channel Assessment (CCA). The Standard specifies these parameters (partly) in order to provide unbiased wireless network access privileges to all user stations.

The CCA requirement defined in the Standard (part of the Carrier Sense Medium Access and Collision Avoidance (CSMA/CA) protocol) requires each station with an impending transmission to sense the medium (airwaves) and determine if the medium is busy first in order to avoid a collision with another station transmission. The Standard further specifies that compliant stations are capable of setting the receiver energy detect threshold used in accordance with the CCA requirement at a level approximately at or below the receiver's minimum sensitivity level (see IEEE 802.11 specifications for details) when verifying conformance. Importantly, with respect to station transmit power, the Standard also specifies that the energy detect threshold, as part of the CCA, may be adjusted higher for lower transmit power levels.

In a typical IEEE 802.11 network, the minimum cell size that may be realized is closely related to the transmit power output (minimum) and the receiver sensitivity (rate dependent). A typical adjustment range for WLAN stations may be about 1 mW to 100 mW (0 dBm/20 dBm) while typical receiver sensitivities are normally fixed (not adjustable) slightly below the minimum specified Standard requirement for compliance. Although reducing the transmit power even lower (than 1 mW) may seem a reasonable approach to reducing (configurable) cell sizes even further, radio development issues may become critical (which are outside the scope of this application) and therefore, this cell size adjustment means may be considered undesirable.

In larger multi-cell wireless networks where RF channel frequency reuse is common, a minimum percentage of inter-cell overlap is usually desirable in order to minimize RF channel contention. Then, an increase in the multi-cell density for such larger networks effectively worsens the RF channel contention problem as a result of the increased number of co-channel (contending) stations present and the excessive inter-cell coverage overlap that occurs. A method to mitigate the inter-cell contention problem in high density networks may be accomplished by means of adjustment of the AP and client station receiver sensitivity, CCA sensitivity, and transmit power output parameters in a relatively cooperative manner. As a result, the RF channel capacity may be optimized and an overall WLAN capacity performance increase may be realized. Thus, a need exists for a technique to control the adjustment of the AP and client station receiver sensitivity, CCA sensitivity, and transmit power output parameters in a relatively cooperative manner.

BRIEF SUMMARY OF THE INVENTION

In accordance with an aspect of the present invention, the present invention solves the communication problem for an IEEE 802.11 WLAN with a High Density infrastructure (network of access points) with High Density clients (stations) while allowing co-existence with non-High Density clients overlapping and/or associated to the High Density network. An aspect of the present invention defines a set of new Information Elements (IEs) to be used between a High Density Access Point (HD AP) and Client (HD Client). These information elements allow a HD AP to advertise its HD capacity (and/or configuration/parameters) to nearby clients, allowing the clients to tune these parameters prior, during and/or after associating with the HD AP and to adjust the HD operating parameters after the client has associated to the HD AP.

In accordance with an aspect of the present invention, there is disclosed herein a method for distributing configuration parameters. The method comprises receiving a signal from a station indicating that the station is capable of adjusting its transmit power setting, receiver sensitivity threshold setting and clear channel assessment threshold setting, and transmitting a frame comprising a transmit power setting, a receiver sensitivity threshold setting and a clear channel assessment threshold setting for the station.

In accordance with an aspect of the present invention, there is disclosed herein an access point comprising a wireless transceiver and a controller coupled to the wireless transceiver and operable to control the operation of the wireless transceiver. The controller is responsive to the wireless transceiver receiving a signal from a station indicating that the station is capable of adjusting its transmit power setting, receiver sensitivity threshold setting and clear channel assessment threshold setting to cause the wireless transceiver to transmit a frame comprising a transmit power setting, a receiver sensitivity threshold setting and a clear channel assessment threshold setting.

In accordance with an aspect of the present invention, there is described herein a wireless station comprising a wireless transceiver and a controller coupled to the wireless transceiver and operable to controlling the operation of the wireless transceiver. The controller is configured for sending a probe request frame comprising an information element indicative of the station being capable to adjust one of the group consisting of a transmit power setting, receiver sensitivity threshold setting and clear channel assessment threshold setting responsive to receiving a frame comprising a transmit power setting, receiver sensitivity threshold setting and clear channel assessment threshold setting. The controller is further configured for receiving a probe response frame comprising one of the group consisting of a transmit power setting, a receiver sensitivity threshold setting and a clear channel assessment threshold setting. Additionally, the controller further configured to adjusting one of the group consisting of transmit power setting, receiver sensitivity threshold setting and clear channel assessment threshold setting responsive to the one of the group consisting of the transmit power setting, the receiver sensitivity threshold setting and the clear channel assessment threshold setting in the probe response frame.

In accordance with an aspect of the present invention, there is disclosed herein a computer program product having a computer readable medium having computer program logic recorded thereon for distributing configuration parameters. The computer program product comprising means for receiving a signal from a station indicating that the station is capable of adjusting its transmit power setting, receiver sensitivity threshold setting and clear channel assessment threshold setting and means for transmitting a frame comprising a transmit power setting, a receiver sensitivity threshold setting and a clear channel assessment threshold setting. setting that the station is operating within.

In accordance with an aspect of the present invention, there is disclosed herein a computer program product having a computer readable medium having computer program logic recorded thereon for determining configuration parameters. The computer program product comprising means for sending a probe request frame comprising an information element indicative of the station being capable to adjust one of the group consisting of a transmit power setting, receiver sensitivity threshold setting and clear channel assessment threshold setting responsive to receiving a frame comprising a transmit power setting, receiver sensitivity threshold setting and clear channel assessment threshold setting, means for receiving a probe response frame comprising one of the group consisting of a transmit power setting, a receiver sensitivity threshold setting and a clear channel assessment threshold setting, and means for adjusting one of the group consisting of transmit power setting, receiver sensitivity threshold setting and clear channel assessment threshold setting responsive to the one of the group consisting of the transmit power setting, the receiver sensitivity threshold setting and the clear channel assessment threshold setting in the probe response frame.

An aspect of the present invention is that it allows a mixture of High Density clients and traditional non-High Density clients to operate in the High Density network (backward compatibility). Another aspect of the present invention is that it provides the flexibility to adjust High-Density operating parameters for a portion or the entire high density network. Still another aspect of the present invention is that it provides flexibility to change the operating parameters after clients have associated to the High Density Network.

Still other objects of the present invention will become readily apparent to those skilled in this art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without departing from the invention. Accordingly, the drawing and descriptions will be regarded as illustrative in nature and not as restrictive.

BRIEF DESCRIPTION OF THE SEVERAL VIEWS OF THE DRAWING

The accompanying drawings incorporated in and forming a part of the specification, illustrates several aspects of the present invention, and together with the description serve to explain the principles of the invention.

DETAILED DESCRIPTION OF INVENTION

Figure 1:
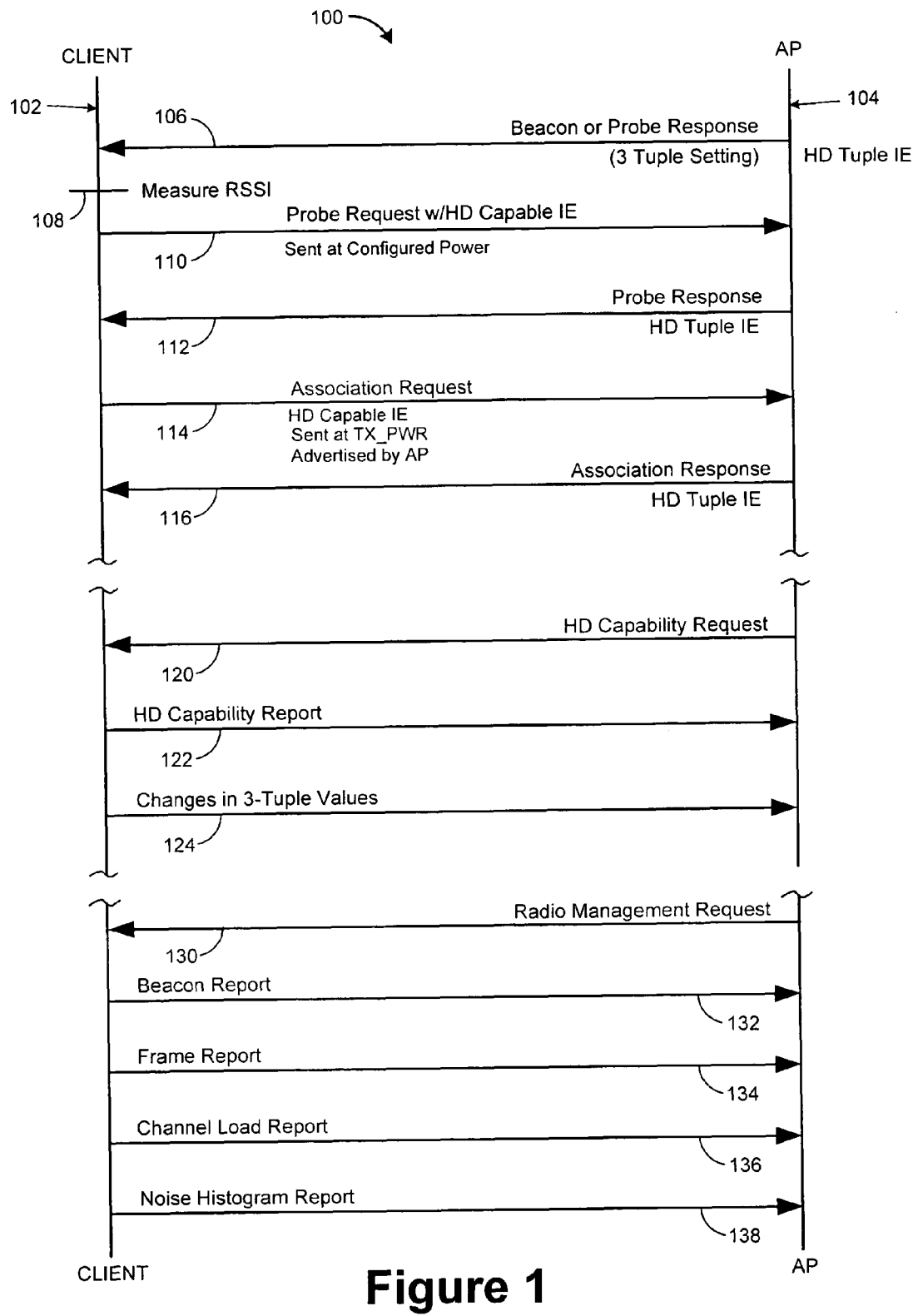
FIG. 1 is a signal diagram illustrating various signals exchanged in an exemplary embodiment.

Throughout this description, the preferred embodiment and examples shown should be considered as exemplars, rather than limitations, of the present invention.

An aspect of the present invention includes a High Density feature addition to Cisco's Structured Wireless-Aware Network (SWAN) Architecture that affects software including Network Management (NM), Radio Management (RM) and Access Point/Radio Firmware and hardware including AP's and client stations. The present invention defines a set of new Information Elements (IEs) to be used between a High Density Access Point (HD AP) and Client (HD Client). These information elements allow a HD AP to advertise its HD capacity (and/or configuration/parameters) to nearby clients, allowing the clients to tune these parameters prior, during and/or after associating with the HD AP and to adjust the HD operating parameters after the client has associated to the HD AP.

For example, a Radio Manager (RM) function manages the configuration of each of the WLAN Access Points radios to achieve an optimum performance WLAN infrastructure. One objective for a RM, therefore, is Transmit Power Control (TPC) management intended to align the WLAN infrastructure and better fit the local environment. Large environments are not usually homogenous in type resulting in large variations in RF propagation characteristics observed. These RF propagation characteristics depend strongly on the structural partitioning (for example fixed office walls) and the density of equipment (e.g., clutter) and are too difficult to predict. TPC is an important factor in equalizing propagation effects and therefore, improves overall network coverage and capacity, interference management, and cell loading management within the wireless network.

As will be described herein infra, a High Density compliant station (e.g., client hardware) supports the following HD system requirements:

a) 3-Tuple Tuning
b) Transmit Power Control
c) HD Advertisement
d) HD Capability Exchange
e) STA Association
f) AP Directed Tuning for on-channel operation
g) AP Directed Tuning for off-channel operation (RM Measurement)
h) STA Tuning Allowance A High Density client includes a set of tuning requirements, including what is referred to herein as 3-Tuple parameters that include adjustment of Transmitter Power (TX_PWR), adjustment of Receiver Sensitivity Threshold (RX_SENS_THRES), and adjustment of Clear Channel Assessment Sensitivity Threshold (CCA_SENS_THRES) in such a manner as to improve the overall (and local) performance with respect to a typical (non-adjusted) WLAN network. It should be noted that to remain 802.11 Standard compliant, stations may be required to set the default or operational 3-Tuple configuration parameters within the IEEE specification limits described in the Standard.

Since for an 802.11 standard compliant station the default HD 3-Tuple parameter settings of HD-STA's (HD clients) are roughly equivalent to those of non-HD-STA's (i.e.: HD-STA's having default settings are roughly the performance equivalent to non-HD or HD disabled STA's), the HD infrastructure advertises the existence of the HD-AP WLAN infrastructure to the HD-STA's as well as providing for the HD-AP WLAN infrastructure to determine the HD-Capability of any STA's operating within the HD-AP communication range. The mechanisms to support HD advertisement are a HD-Tuple IE in Beacon and Probe-Response frames, a HD- Capable IE in Probe-Request frames, and a HD-Capable IE in the Association/Re-association-Request frames.

A beacon and Probe-Response frame transmitted by a HD-enabled AP comprises a HD-Tuple IE. The contents of the HD-Tuple IE include the 3-Tuple setting that the HD-STA uses when associating to the HD-AP. For the purposes of link budget calculations, the HD-STA applies the same advertised 3-Tuple settings for the HD-AP.

HD-Capable IE is inserted in a Probe-Request to indicate that the client sending the Probe-Request is HD-capable. All Probe-Request frames sent by a HD capable client includes the HD-Capable IE and is sent out using the STA's configured TX power, not the TX_PWR specified in any of the beacon frames from any nearby HD-AP's.

A HD-Capable IE is included in the Association/Re-association-Request sent by a HD capable client. All (re)association Request frames sent by HD capable STA's to HD-capable AP's includes the HD-Capable IE and be sent out at the TX_PWR currently advertised by the target HD-AP. Inclusion of this information element indicates to the HD-AP that the requesting client is capable of HD-mode.

If an AP is in HD-mode (beaconing and probe-responding with HD-IE), and a HD-capable client has decided to associate with this HD-AP, it sets its 3-tuple settings to match the AP's HD 3-Tuple settings as advertised in the Beacon/Probe-Response frame before accessing the HD-AP. These settings begin to apply when the very first frame is transmitted to the HD-AP. This is typically the Authentication frame. The HD-STA includes the HD-Capable IE in the Association/Re-association-Request frame when trying to associate with the HD-AP.

Once a HD-Capable client has successfully associated and authenticated with the HD-AP, a frame exchange (unicast) may happen between the HD-AP and the associated HD-STA to further exchange the HD capability. The frame exchange includes a HD Capability-Request and a HD-Capability Report. A HD-Capability-Request (from AP to STA) to request client reporting its 3-Tuple capability. A HD-AP only issues a HD-Capability-Request to a HD-capable client that included the HD-Capable IE in the (re)association Request frame. A HD-Capability-Report (from STA to AP)—contains the range (high and low) of the 3-Tuple that the STA is capable of operating within. The HD capable client populates the HD-Capability-Report with its supported 3-Tuple range. These parameters indicate the capability of the STA, not the current setting of the STA. The HD capability exchange may happen at any time while a HD-STA is associated to a HD AP.

For association, HD enabled STA's attempting to associate to a HD-AP are expected to measure sufficient receive signal strength (RSSI) from the target HD-AP to reliably maintain association (i.e.: the receiving RSSI from the target HD-AP is greater than advertised RX_SENS_THRES and provides a sufficient SNR to support the minimum basic data rate advertised in the Beacon/Probe Response). For cases when the HD function of HD-STA's is disabled, the HD-STA associates as a non-HD-STA. However, the HD-AP may refuse the association request of the STA. If the association request is refused by the HD-AP for reasons related to HD, the HD-AP sends a (re)association response to the non-HD-STA that includes a status field indicating '(re)association denied due to reason outside the scope of the standard'. The HD-AP (re)association response also includes the HD 3-Tuple parameters to inform STA's about the reason for the association response (rejection). It should be noted that HD-STA's using HD 3-tuple settings that differ from those advertised or directed by the HD-AP may reduce wireless network performance.

An aspect of the present invention is that it supports directed tuning for serving channel operation. For example, it may be required by the AP at times to tune the 3-tuple settings for the serving channel of a given BSS. The mechanism to initiate the 3-Tuple tuning from a HD-AP for the current serving channel is indicated to all the associated HD-STA's by making a change to the HD-Tuple IE in the Beacon/Probe-Response frame. All currently associated HD-STA's updates these parameters upon the first reception of the new setting in the Beacon or Probe Response frames. The new parameters are applied within 200 ms after receiving the updated 3-tuple settings.

An aspect of the present invention is that it supports Directed Tuning for Non-Serving Channel operation. Radio Management can request a client to perform a Radio Management operation for both serving and non-serving channels. Depending on the type of channel service (serving/non-serving) and depending on the type of RM procedure that is required for the client, the settings for the RX_SENS_THRES, CCA_SENS_THRES, and TX_PWR parameters may be different than the setting used in the current HD-AP association. Since multiple RM-request elements can be embedded into a single Radio Measurement Request message, a large amount of protocol overhead can be introduced if individual HD 3-tuple settings are embedded into each RM-request element. Therefore, as will be described herein infra, the approach is to define these parameters during HD-STA's Radio Measurement's procedure without sending these parameters from HD-AP to HD-STA on a per-request basis.

A HD-STA is expected follow the HD 3-Tuple tuning advertised by the HD-AP upon association to the HD-AP or if subsequently directed by the associated HD-AP. A HD-STA may change (re-tune) from advertised HD 3-Tuple settings due to changes in platform HD compatibility (i.e. platform noises). For such cases, the revised RX_SENS_THRES and CCA_SENS_THRES range limits is reported promptly and inform HD-AP by sending a new HD-Capability-Report without explicit solicitation from HD-AP. Furthermore, a HD-STA may change (re-tune) from advertised HD 3-Tuple settings due to self-tuning algorithms by the HD-STA intended to improve link performance. For such cases, the HD-STA can report changes in 3-Tuple values, for example if the new values result in higher TX_PWR, lower RX_SENS_THRES, or lower CCA_SENS_THRES. These changes in 3-Tuple values is reported to the HD-AP by autonomously sending a HD-Capability-Report to the associated HD-AP. The HD-Capability-Report is sent immediately following the new change in 3-tuple settings. Note that HD-STA's using HD 3-tuple settings that differ from those advertised or directed by the associated HD-AP may impair network management and/or network performance objectives.

The range of the 3-Tuple parameters can be dependent upon the protocol or standard the HD-AP and HD-STA are implementing. For example, the below table illustrates typical range limitations for common 802.11 standards (referred to as .11 below, e.g., .11a refers to 802.11a):

| 3-Tuple Tuning Range Specification Table | | | | |
| --- | --- | --- | --- | --- |
| Range Limit Descriptions | Type | Minimum | Maximum | Unit |
| Transmit Power Output, Upper Limit TX_PWR | .11a | 15 | | dBm |
| | .11g | 17 | | |
| | .11b | 20 | | |
| Transmit Power Output, Lower Limit TX_PWR | .11a | | −1 | |
| | .11g | | −1 | |
| | .11b | | −1 | |
| Receive Sensitivity Threshold, Upper Limit RX_SENS_THRES | .11a | −50 | | |
| | .11g | −50 | | |
| | .11b | −50 | | |

-continued

3-Tuple Tuning Range Specification Table

| Range Limit Descriptions | Type | Minimum | Maximum | Unit |
|---|---|---|---|---|
| Receive Sensitivity Threshold, Lower Limit | .11a | | −86 | |
| RX_SENS_THRES | .11g | | −86 | |
| | .11b | | −92 | |
| Clear Channel Assessment Sensitivity Threshold, Upper Limit | .11a | −50 | | |
| CCA_SENS_THRES | .11g | −50 | | |
| | .11b | −50 | | |
| Clear Channel Assessment Sensitivity Threshold, Lower Limit | .11a | | −92 | |
| CCA_SENS_THRES | .11g | | −92 | |
| | .11b | | −98 | |

HD-STA's tune their RX_SENS_THRES and CCA_SENS_THRES parameters advertised by the HD-AP without explicit solicitation. HD-AP's and HD-STA's within a cell may use the same or different 3-tuple settings. Separate HD cells may use different HD 3-Tuple settings, as desired.

In one embodiment, HD-AP's advertise their HD-STA RX_SENS_THRES and CCA_SENS_THRES parameters equal in value (in lockstep). In addition, HD-AP's advertises a single (the same) 3-Tuple parameter set for all HD-STA's operating within the cell. In another embodiment, HD-AP's advertise their HD-STA RX_SENS_THRES and CCA_SENS_THRES parameters independently in value. In addition, HD-AP's may utilize different 3-Tuple parameter sets for HD-STA's operating within the HD cell.

The HD-AP advertises the TX_PWR and RX_SENS_THRES parameters to the HD-STA's for the purpose of defining a physical HD-STA cell sizes (range). The implementation of RX_SENS_THRES may include either a carrier sense (CS) with energy above a threshold (ED) or energy above a threshold (ED) only. For either case, the ED threshold setting can be compliant with the RX_SENS_THRES ranges described herein.

The HD-AP advertises the CCA_SENS_THRES parameter to the HD-STA for the purpose of defining a physical HD-STA clear channel assessment range. The implementation of the CCA_SENS_THRES may include either a Carrier Sense (CS) with Energy Detect (ED) above a threshold or Energy Detect (ED) above a threshold. For either case, the ED threshold setting can be compliant with the CCA_SENS_THRES ranges described herein.

The Clear Channel Assessment (CCA) Mode for HD-AP's and HD-STA's operating in a High Density networks can include either Carrier Sense (CS) with Energy Detect above a threshold (ED), the preferred type or Energy Detection (ED) above a Threshold, a permitted type. STA's that support other IEEE CCA modes such as Carrier Sense Only mode without an adjustable Energy Detect threshold may not be HD capable (i.e. legacy network density only).

An example of CCA Mode employing Carrier Sense with Energy above a Threshold is " . . . . Upon receiving the transmitted energy, the PMD_ED (energy detect) primitive is ENABLED as the RSSI reaches/exceeds the ED_THRESHOLD and the PMD_CS (carrier sense) is ENABLED after the correlator SQ reaches/exceeds the CS_THRESHOLD and code lock is established. These two conditions must be TRUE (logical AND) to indicate activity to the MAC via PHY-CCA.interface primitive PHY-CCA.indicate. A busy channel is indicated by the PHY-CCA.indicate of class BUSY. A clear channel is indicated by the PHY-CCA.indicate of class IDLE. The PMD primitives PMD_SQ and PMD_RSSI are issued to update the RSSI and SQ parameters reported to the MAC."

An example of CCA Mode: Energy above a Threshold is " . . . . Upon receiving the transmitted energy, the PMD_ED (energy detect) primitive is ENABLED as the RSSI reaches/exceeds the ED_THRESHOLD. This condition must be TRUE to indicate activity to the MAC via PHYCCA.interface primitive PHY-CCA.indicate. A busy channel is indicated by the PHY-CCA.indicate of class BUSY. A clear channel is indicated by the PHY-CCA.indicate of class IDLE. The PMD primitive PMD_RSSI is issued to update the RSSI parameter reported to the MAC."

As described herein the specifications shown in the 3-Tuple Tuning Range Table are based on typical 802.11 radio performance capabilities (average values). STA's that operate with a reduced 3-tuple working range window are not excluded from High Density networks, although, a performance impact may be experienced as a result (usually a range issue). Furthermore, aspects of the present invention are suitably adaptable to any type of wireless network that allows for adjustment of one or more of the 3-Tuple parameters.

Herein infra there will be described extensions to 802.11 management frames to support HD operation. Although the below described frames are described in the context of an 802.11 network, those skilled in the art should readily appreciate that is the aspects of these frames are adaptable to any wireless network.

Beacon frames transmitted by a HD-Capable and enabled AP/Radio include the HD-IE (High Density Information Element) as illustrated in the following table.

| Information Element | Note |
|---|---|
| HD-Tuple | The HD-Tuple indicates that the transmitting AP/Radio is capable of HD-operation and includes the recommended HD 3-tuple settings for HD-STA's to access the HD-AP. These parameters are not intended to represent the HD-AP settings specifically. |

Probe-Request frames transmitted by a HD-capable station (client or neighboring AP) may choose to include HD-Enable IE in its Probe-Request frame as shown in the following table.

| Information Element | Note |
|---|---|
| HD-Enable | Indicates this station is capable of HD-operation. |

Probe-Response frames transmitted by a HD-enabled AP/Radio include the HD-Tuple IE (High Density Information Element) as illustrated in the following table. The HD-Tuple IE is sent in response to a Probe-Request frame containing HD-Capability IE (see Probe-Request Frame supra). The absence of HD-IE in Probe-Response frame in response to a Probe-Request containing HD-Capability-IE indicates the AP/Radio does not support HD-mode of operation (incapable of or capability is disabled).

| Information Element | Note |
|---|---|
| HD-Tuple | Indicates this AP/Radio is capable of HD-operation and includes the recommended HD 3-tuple settings for HD-STA's to access the HD-AP. These parameters are not intended to represent the HD-AP settings specifically. |

An Association/(Re)association request transmitted by a HD-enable station includes HD-Enable IE in its association and (Re)association frames to HD-Infrastructure AP as shown in the following table if it wants to operate in the HD-mode.

| Information Element | Note |
|---|---|
| HD-Enable | Indicates this station is capable of HD-operation. |

An Association/(Re)Association-Response frame transmitted by a HD-enabled AP/Radio includes the HD-Tuple as illustrated in the following table in response to an Association/(Re)Association-Request frame containing HD-Enable IE. Absence of a HD-Tuple in Association/(Re)Association-Response frame in response to a Probe-Request containing HD-Enable IE indicates the AP/Radio does not support HD-mode of operation (e.g., is incapable of or capability is disabled).

| Information Element | Note |
|---|---|
| HD-Tuple | Indicates this AP/Radio is capable of HD-operation and includes the recommended HD 3-tuple settings for HD-STA's to access the HD-AP. These parameters are not intended to represent the HD-AP settings specifically. |

The below table is an example of a new information element (IE), the HD 3-Tuple Information Element (HD 3-Tuple IE) and exemplary settings for a HD-AP infrastructure (HD-STA's). The below example is for an 802.11 network. Although the below IE shows fields specific to 802.11 networks, those skilled in the art should readily appreciate that various fields can be modified or eliminated to adapt the IE to other types of wireless networks.

| Field | Size (in octets) | Value | Description |
|---|---|---|---|
| Element ID | 1 | 0xDD | IEEE 802.11 vendor specific usage |
| Length | 1 | 9 | Remaining IE's length |
| OUI | 3 | 00:40:96 | Cisco specific OUI (Organizational Unique Identifier) |
| OUI type | 1 | 0x06 | Identify the type of this IE belongs to High-Density category |
| HD Subtype | 1 | 0x01 | Identify this IE is HD-Tuple |
| Reserved | 1 | 0 | Reserved (set to 0) |
| RX_SENS_THRES | 1 | −127 to 127 | Receive Sensitivity Threshold in units of dBm. |
| CCA_SENS_THRES | 1 | −127 to 127 | Clear Channel Assessment Sensitivity Threshold in units of dBm. |
| TX_PWR | 1 | −127 to 127 | Transmit Power in units of dBm. |

Below is an example of a new IE, the HD-Enable IE. This IE is used by HD-STA's to inform a HD-AP that it is operating in HD-mode. The below example is for an 802.11 network. Although the below IE shows fields specific to 802.11 networks, those skilled in the art should readily appreciate that various fields can be modified or eliminated to adapt the IE to other types of wireless networks.

| Field | Size (in octets) | Value | Description |
|---|---|---|---|
| Element ID | 1 | 0xDD | IEEE 802.11 vendor specific usage |
| Length | 1 | 5 | Remaining IE's length |
| OUI | 3 | 00:40:96 | Cisco specific OUI (Organizational Unique Identifier) |
| OUI type | 1 | 0x06 | Identify the type of this IE belongs to High-Density category |
| HD Subtype | 1 | 0x02 | Identify this IE is HD-Enable |

In addition to the frames just described herein, the present invention also contemplates new IAPP (Inter-access point protocol) frames that may be sent between the HD-AP and successfully associated/authenticated HD-STA's. The new IAPP frames include the HD-Capability-Request Frame and the HD-Capability-Report Frame.

The HD-Capability-Request Frame, an example of which is illustrated below, can be sent at any time after the HD-STA has successfully associated/authenticated with the HD AP. A HD-AP can send this frame to query HD-STA's HD-capability and a HD-STA can send this frame to query HD-AP's HD-capability.

| Field | Size (in octets) | Value | Description |
|---|---|---|---|
| Cisco Aironet SNAP header | 8 | AA:AA:03:00:40:96:00:00 | This is a Cisco proprietary IAPP frame |
| IAPP ID & | 2 | 0x:xx | 0 indicates this is a IAPP control |

-continued

| Field | Size (in octets) | Value | Description |
|---|---|---|---|
| Length | | | frame<br>xxx indicates the frame length in bytes |
| IAPP Type | 1 | A predetermined value | Indicates this is HD-Capability frame |
| IAPP Subtype | 1 | 0x01 | Request frame |
| Destination MAC address | 6 | xx:xx:xx:xx:xx:xx | Address of the HD-node being queried (BSSID for AP and MAC address for client). |
| Source MAC Address | 6 | xx:xx:xx:xx:xx:xx | Address of the HD-node which made the query request (BSSID for AP, MAC address for client). |

The HD-Capability-Report Frame, an example of which is illustrated below, is sent by a HD-STA to a HD-AP upon receiving a HD-Capability-Request Frame. It may also be sent by a HD-STA autonomously without the explicit solicitation from the HD-AP via a HD-Capability-Request frame. This can be useful when a HD-STA needs to inform the HD-AP about a change in HD-capability and/or may include a change from the HD-Tuple settings. This IAPP frame is sent by a HD-AP to a HD-STA upon receiving a HD-Capability-Request frame sent by the HD-STA. A HD-AP does not send this frame autonomously without being solicited by a HD-STA through the receiving of a HD-Capability-Request frame.

| Field | Size (in octets) | Value | Description |
|---|---|---|---|
| Cisco Aironet SNAP header | 8 | AA:AA:03:00:40:96:00:00 | This is a Cisco proprietary IAPP frame |
| IAPP ID & Length | 2 | 0x:xx | 0 indicates this is a IAPP control frame<br>xxx indicates the frame length in bytes |
| IAPP Type | 1 | <<TBD>> | Indicates this is HD-Capability frame |
| IAPP Subtype | 1 | 0x81 | Response frame |
| Destination MAC address | 6 | xx:xx:xx:xx:xx:xx | Address of the HD-node being queried (BSSID for AP and MAC address for client). |
| Source MAC Address | 6 | xx:xx:xx:xx:xx:xx | Address of the HD-node which made the query request (BSSID for AP, MAC address for client). |
| MIN_RX_SENS_THRES | 1 | −127 to 127 | Minimal Receive Sensitivity Threshold supported in units of dBm |
| MAX_RX_SENS_THRES | 1 | −127 to 127 | Maximum Receive Sensitivity Threshold supported in units of dBm, where Min <= MAX |
| MIN_CCA_SENS_THRES | 1 | −127 to 127 | Minimum Clear Channel Assessment Sensitivity Threshold in units of dBm. |
| MAX_CCA_SENS_THRES | 1 | −127 to 127 | Maximum Clear Channel Assessment Sensitivity Threshold in units of dBm, where Min <= MAX |
| MIN_TX_PWR | 1 | −127 to 127 | Minimal Transmit Power in units of dBm. |
| MAX_TX_PWR | 1 | −127 to 127 | Maximal Transmit Power in units of dBm |
| CUR_RX_SENS_THRES | 1 | −127 to 127 | Current Receive Sensitivity Threshold in use by the HD-STA in units of dBm |
| CUR_CCA_SENS_THRES | 1 | −127 to 127 | Current Clear Channel Assessment Sensitivity Threshold in use by the HD-STA in units of dBm |
| CUR_TX_PWR | 1 | −127 to 127 | Current Transmit Power in use by the HD-STA in units of dBm |

-continued

| Field | Size (in octets) | Value | Description |
|---|---|---|---|
| Reason Codes | 1 | 0 to 255 | Reason for HD-STA 3-Tuple settings:<br>0 - (Re) Set HD-Tuple IE<br>1 - Optimize Set, Platform Noise<br>2 - Optimize Set, Exposed Node<br>3 - Optimize Set, Hidden Node<br>4 - Optimize Set, Unspecified |

The present invention contemplates no new Radio Management messages or information elements defined specifically between the HD-STA and HD-Infrastructure. However, the 3-tuple parameters used when HD-STA performs Radio management requests are set differently when the HD-STA is operating in HD-mode as will now be described.

Beacon Report—This report is sent by STA after it scans the channels (both on and off serving channel) and summarizes the detected beacon frames and the probe-response frames. A HD-STA uses the standard IEEE 802.11 default settings (i.e. min RX Sensitivity threshold) for demodulating as many beacon frames and probe-response frames as possible. When performing active off-channel scanning, a HD-STA also sends a probe-request frame using configured TX power rather than using the TX_PWR in the HD-Tuple IE.

Frame Report—This report is sent by STA after scanning the channel for frames sent to/from a matching target source-address. A HD-STA uses standard IEEE 802.11 settings (i.e. min RX Sensitivity Threshold) when conducting this procedure.

Channel Load Report—This report is sent by STA after measuring the serving channel for the relative percentage of idle/busy duration. When conducting this procedure, the HD-STA uses the CCA_SENS_THRES setting as defined in the HD-Tuple IE sent via a Beacon/Probe Response frame from the currently associated HD-AP.

Noise Histogram Report—This report is complementary to the Channel Load Report from the perspective of identifying the presence of energy below the RX_SENS_THRES sent by the HD-AP for the intended HD-cell size. Therefore, HD-STA's conduct this procedure using the default RX_SENS_THRES setting representing the default HD-cell size.

FIG. 1 is a signal diagram 100 illustrating various signals exchanged in an exemplary embodiment. The left side of the diagram shows signals sent and received by a high density client 102 and the right side shows signals sent and received by an a high density access point 104. The order of the signals shown are illustrative and not necessarily required; nor are all of the signals shown necessary for implementing aspects of the present invention.

As illustrated in FIG. 1, client 102 receives a frame 106, such as a beacon or probe response frame, sent by AP 104 that contains a HD-Tuple IE. As shown at 108, client 102 measures the RSSI of the frame. For association, HD enabled STA's attempting to associate to a HD-AP are expected to measure sufficient receive signal strength (RSSI) from the target HD-AP to reliably maintain association (i.e.: the receiving RSSI from the target HD-AP is greater than advertised RX_SENS_THRES and provides a sufficient SNR to support the minimum basic data rate advertised in the Beacon/Probe Response).

Client 102 sends a probe request 110 comprising a HD Capable IE as described herein. Probe request 110 is sent at client 102's configured power. AP 104 sends a probe response 112 responsive to probe request 110. If AP 104 is a HD capable AP, the probe response 112 comprises the HD-Tuple IE as described herein. The HD-Tuple as used in this example includes Transmitter Power (TX_PWR) setting, Receiver Sensitivity Threshold (RX_SENS_THRES) setting, and Clear Channel Assessment Sensitivity Threshold (CCA_SENS_THRES) setting. However, alternative embodiments may only send one or two of the group consisting of TX_PWR, RX_SENS_THRES and CCA_SENS_THRES. It should be further noted that the RX_SENS_THRES and CCA_SENS_THRES parameters can be equal in value (in lockstep), or the RX_SENS_THRES and CCA_SENS_THRES parameters can be different in value.

When AP 104 is in HD mode and a HD capable client (client 112) has decided to associate with AP 104, AP 104 sets its 3-Tuple settings to match the settings advertised by AP 104. AP 104, client 102 sends association (or reassociation) request 114 to AP 104. As was previously described, client 112 sets its 3-Tuple settings to match the 3-Tuple settings advertised by AP 104, therefore Association request 114 is sent at TX_PWR advertised by AP 104. Furthermore, association (or reassociation) request 114 comprises a HD Capable IE as described herein. AP 104, responsive to association request 114, sends an association (or reassociation if appropriate) response 116. Association response 116 comprises the HD Tuple IE as described herein.

After association, the HD client and HD AP may exchange HD capability frames. These frame exchanges are unicast and occur between client 102 and AP 104. A HD-Capability-Request 120 (from AP to STA) requests client 102 reports its 3-Tuple capability.

A HD-Capability-Report 122 (from STA to AP)—contains the range (high and low) of the 3-Tuple settings that client 102 is capable of operating within. Client 102 populates the HD-Capability-Report 122 with its supported 3-Tuple range. These parameters indicate the capability of client 102, not the current setting of client 102. The HD capability exchange may happen at any time while client 102 (a HD-STA) is associated to AP 104 (a HD AP).

Furthermore, a HD-STA may change (re-tune) from advertised HD 3-Tuple settings due to self-tuning algorithms intended to improve link performance. For such cases, the HD-STA can report changes in 3-Tuple values, such as if the new values result in higher TX_PWR, lower RX_

SENS_THRES, or lower CCA_SENS_THRES. These changes in 3-Tuple values are reported to the HD-AP by autonomously sending sua sponte a HD-Capability-Report 124 to the associated HD-AP 104. The HD-Capability-Report 124 is sent immediately following the change in 3-tuple settings.

After client 102 has associated with AP 104, AP 104 may also send a Radio Management Request 130. Radio Management request 130 suitably comprises a request for one or more of a Beacon Report, a Frame Report, a Channel Load Report, and a Noise Histogram Report.

If radio management request 130 included a request for a Beacon Report, Client 102 scans the channels (both on and off serving channel) and summarizes the detected beacon frames and the probe-response frames. Client 102 uses standard IEEE 802.11 default settings (i.e. min RX Sensitivity threshold) for demodulating as many beacon frames and probe-response frames as possible. When performing active off-channel scanning, client 102 sends out probe-request frame using configured TX power rather than using the TX_PWR in the HD-Tuple IE. After scanning the channels client 102 sends Beacon Report 132 to AP 104.

If radio management request 130 included a request for a Frame Report, client 102 scans the channel for frames sent to/from a matching target source-address. Client 102 uses standard IEEE 802.11 settings (i.e. min RX Sensitivity Threshold) when conducting this procedure. After scanning the channels, Frame Report 134 is sent from client 102 to AP 104.

If radio management request 130 included a request for a Channel Load Report, client 102 measures the serving channel for the relative percentage of idle/busy duration. When conducting this procedure, client 102 uses the CCA_SENS_THRES setting as defined in the HD-Tuple IE sent via a Beacon/Probe Response frame (e.g., 106, 110 or 116) from the currently associated AP 104. After measuring the serving channel, client 102 sends Channel Load Report 136 to AP 104.

If radio management request 130 included a request for a Noise Histogram Report, client 102 identifies the presence of energy below the RX_SENS_THRES sent by AP 104 for the intended HD-cell size. Therefore, client 102 conducts this procedure using the default RX_SENS_THRES setting representing the default HD-cell size.

Figure 2:
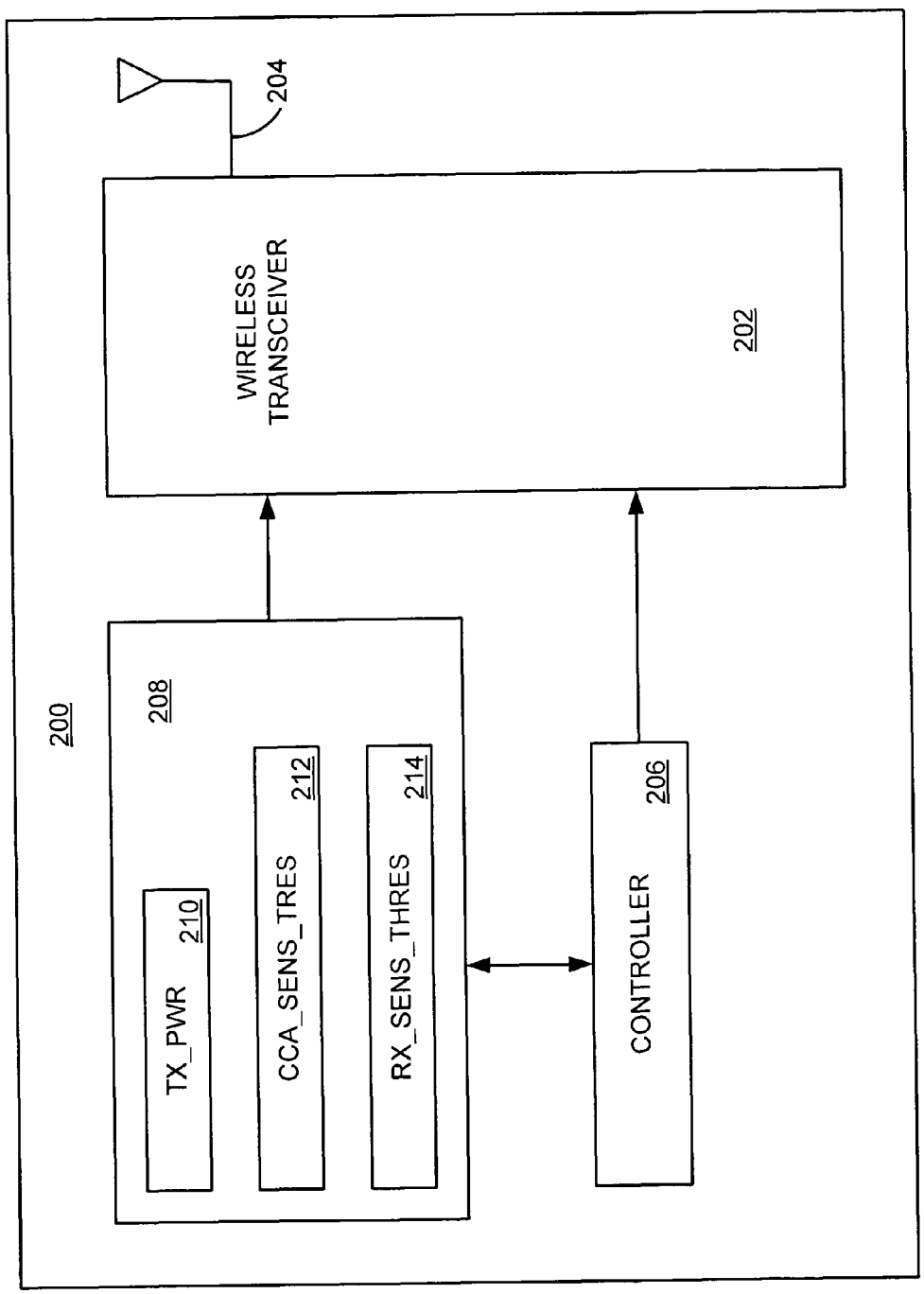
FIG. 2 is a block diagram of a wireless communication device configured in accordance with an aspect of the present invention.

FIG. 2 is a block diagram of a wireless communication device 200 configured in accordance with an aspect of the present invention. Communication device 200 comprises a wireless transceiver 202. Wireless transceiver 202 is suitably any wireless device capable of sending and receiving wireless signals. Wireless transceiver 202 comprises circuitry for performing modulating/demodulating signals, frequency conversion and digital to analog (D/A) or analog to digital (A/D) as needed. Antenna 204 is coupled to wireless transceiver 202. Antenna 204 receives wireless signals that are forwarded to wireless transceiver 202, and antenna 204 transmits wireless signals sent by wireless transceiver 202.

Controller 206 is coupled to wireless transceiver 202 and comprises logic for controlling the operation of wireless transceiver 202. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software.

Memory 208, as shown, is coupled to controller 206 and wireless transceiver 202. Memory 208 stores the settings for TX_PWR 210, CCA_SENS_THRES 212 and RX_SENS_THRES 214 as defined herein. TX_PWR, CCA_SENS_THRES 212 and RX_SENS_THRES 214 are used by wireless transceiver 202 to set its transmit power, Clear Channel Assessment and Receiver Sensitivity Threshold respectively. Controller 206 can control operation of wireless transceiver 202 by changing the settings for TX_PWR 210, CCA_SENS_THRES 212 and RX_SENS_THRES 214.

Furthermore, in an embodiment wherein communication device 200 is an access point (such as access point 104 in FIG. 1), memory 208 may store TX_PWR 210, CCA_SENS_THRES 212 and RX_SENS_THRES 214 for wireless transceiver 202 and for associated clients (not shown). In one embodiment, the settings for CCA_SENS_THRES 212 and RX_SENS_THRES 214 are equal, in an alternate embodiment the settings for CCA_SENS_THRES 212 and RX_SENS_THRES 214 are different.

Figure 3:
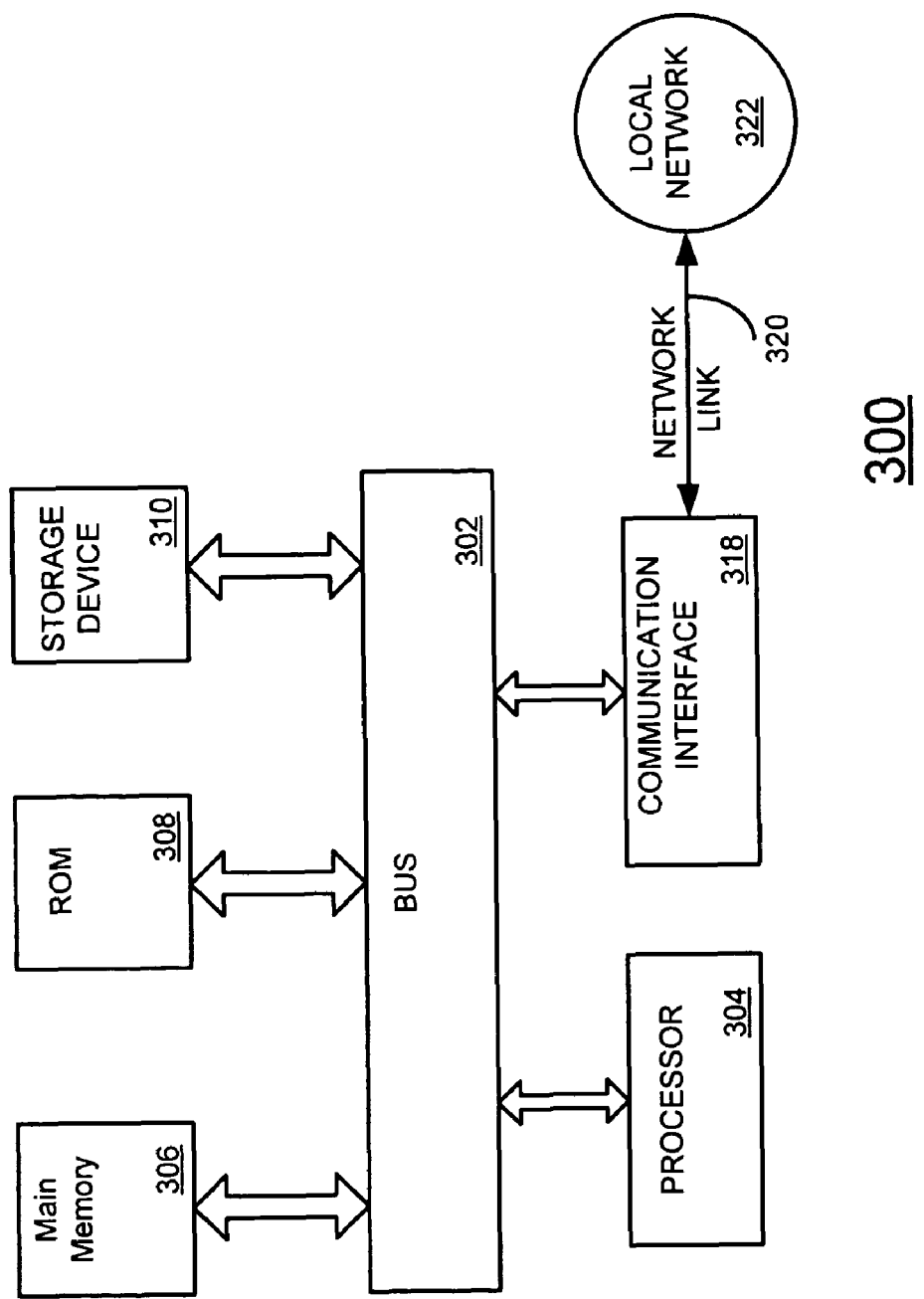
FIG. 3 is a block diagram of a computer system capable of implementing an embodiment of the present invention.

FIG. 3 is a block diagram of a computer system 300 capable of implementing an embodiment of the present invention. For example computer system 300 is capable of implementing controller 206 (FIG. 2) for controlling the operation of a client (for example client 102 in FIG. 1) or for controlling the operation of an access point (for example AP 104 in FIG. 1).

Computer system 300 includes a bus 302 or other communication mechanism for communicating information and a processor 304 coupled with bus 302 for processing information. Computer system 300 also includes a main memory 306, such as random access memory (RAM) or other dynamic storage device coupled to bus 302 for storing information and instructions to be executed by processor 304. Main memory 306 also may be used for storing a temporary variable or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

An aspect of the present invention is related to the use of computer system 300 for the operation of a high density network, including implementing a protocol extension for the high density network. According to one embodiment of the invention, the protocol extension for a high density network is implemented by computer system 300 in response to processor 304 executing one or more sequences of one or more instructions contained in main memory 306. Such instructions may be read into main memory 306 from another computer-readable medium, such as storage device 310. Execution of the sequence of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to non-volatile media and volatile media. Non-volatile media include for example optical or magnetic disks, such as storage device 310. Volatile media include dynamic memory such as main memory 306. Common forms of computer-readable media include for example floppy disk, a flexible disk, hard disk, magnetic cards, paper tape, any other physical medium with patterns of holes, a RAM, a PROM, an EPROM, a FLASHPROM, any other memory chip or cartridge.

Computer system 300 may also includes a communication interface 318 coupled to bus 302. For example, for an access point, communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic, or optical signals that carry digital data streams representing various types of information.

Network link 320 typically provides data communication through one or more networks to other data devices. For example, network link 320 can couple an access point to an external radio management module or other devices on the network for authenticating clients.

Figure 4:
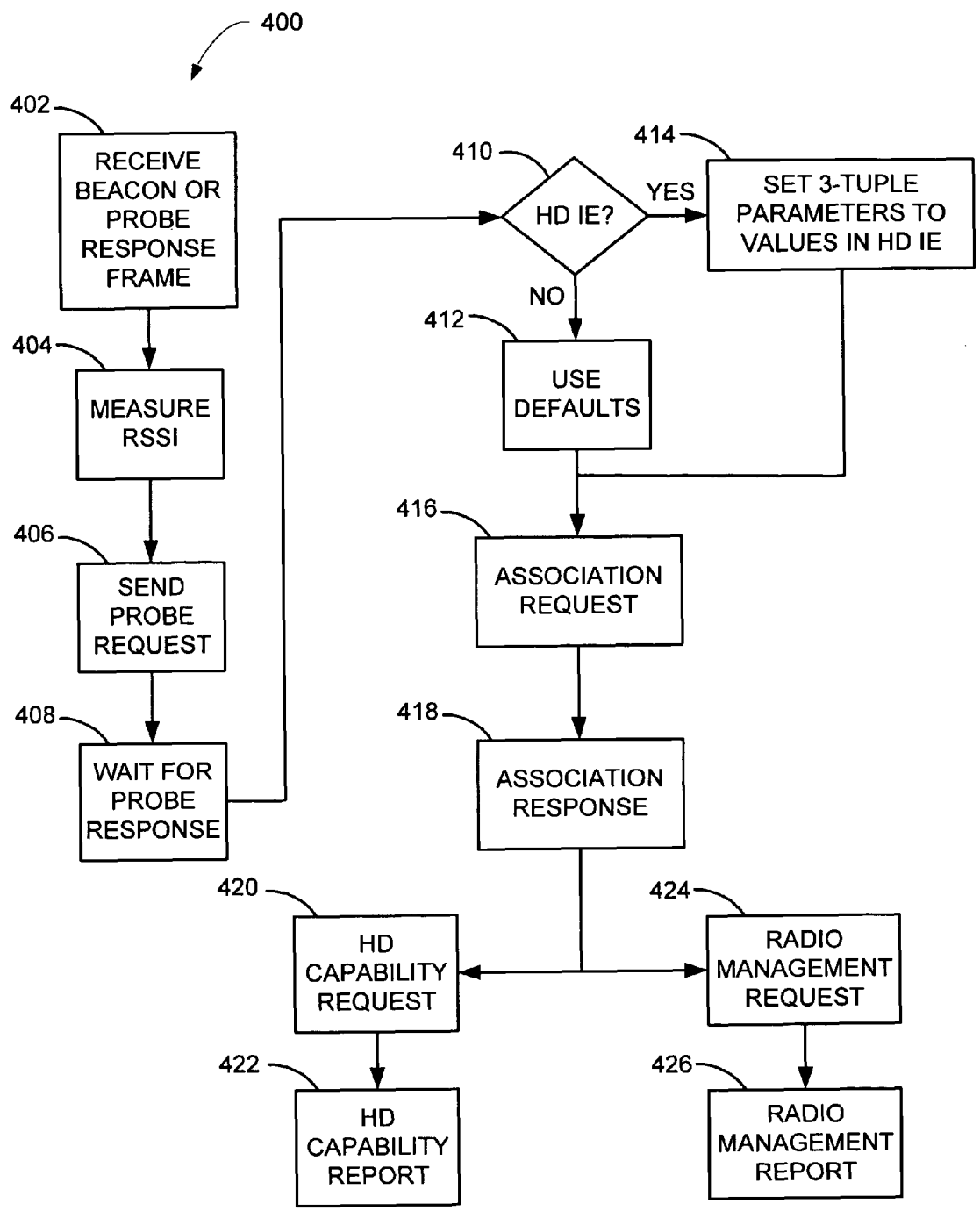
FIG. 4 is a block diagram of a method of operation of a High Density Station.
Figure 5:
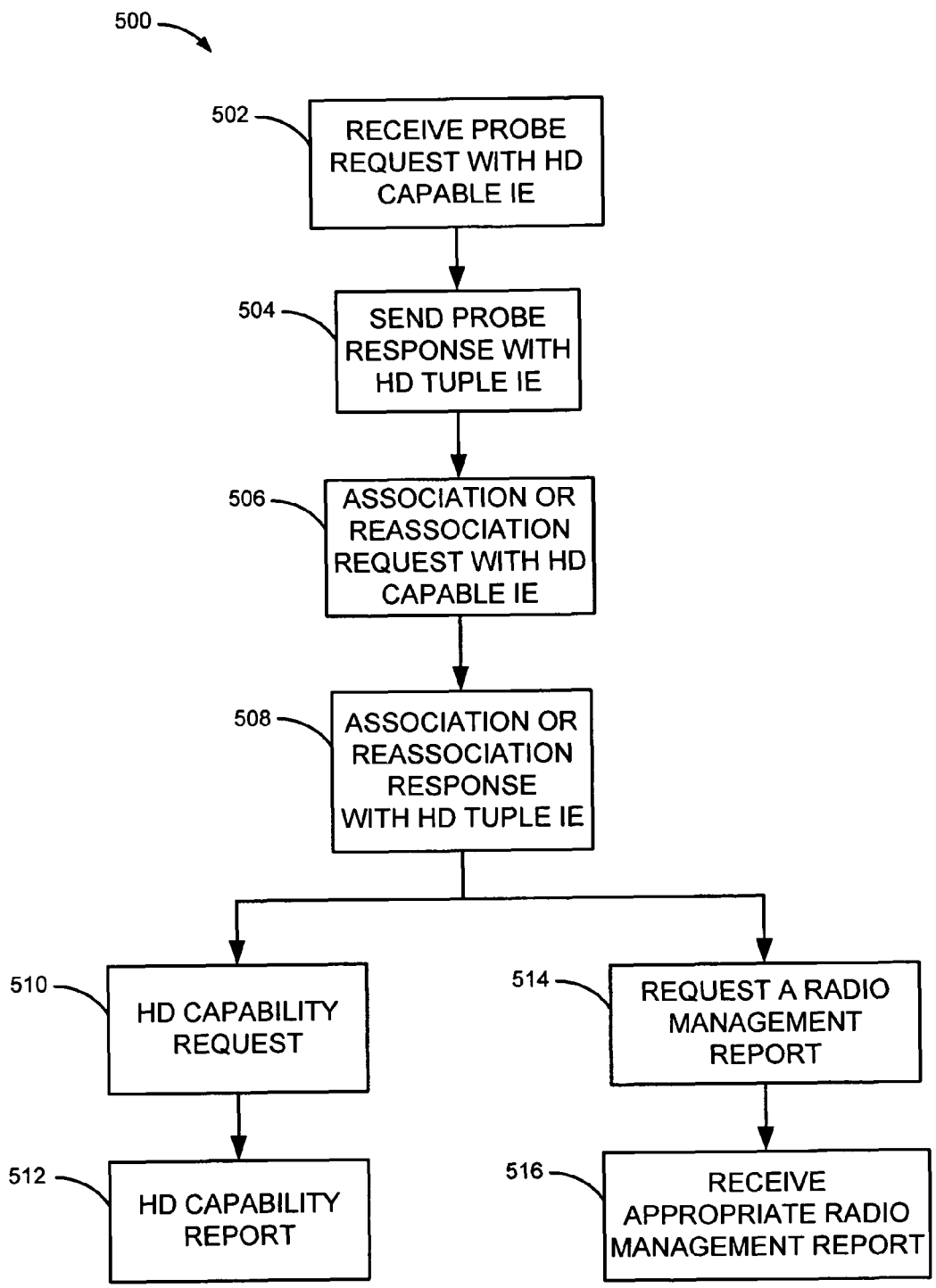
FIG. 5 is a block diagram of a method of operation for a High Density Access Point.

In view of the foregoing structural and functional features described above, methodologies in accordance with various aspects of the present invention will be better appreciated with reference to FIGS. 4 and 5. While, for purposes of simplicity of explanation, the methodology of FIGS. 4 and 5 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. Embodiments of the present invention are suitably adapted to implement the methodology in hardware, software, or a combination thereof.

FIG. 4 is a block diagram of a method of operation of a High Density Station (client) associating with a High Density Access Point (AP). At 402, the client receives a frame, such as a beacon or probe response frame, sent by the high density AP that contains a HD-Tuple IE. At 404, the client measures the RSSI of the frame.

At 406, the client sends a probe request comprising a HD Capable IE as described herein. The probe request is sent at the client's configured power.

At 408, the client waits for a probe response responsive to probe request. Sat 410 it is determined whether the probe response included a high density information element (HD IE). If the AP 104 is a HD capable AP, the probe response comprises a HD-Tuple IE as described herein. The HD-Tuple includes Transmitter Power (TX_PWR) setting, Receiver Sensitivity Threshold (RX_SENS_THRES) setting, Clear Channel Assessment Sensitivity Threshold (CCA_SENS_THRES) setting. However, alternative embodiments may only employ one or two of the group consisting of TX_PWR, RX_SENS_THRES and CCA_SENS_THRES. It should be further noted that the RX_SENS_THRES and CCA_SENS_THRES parameters can be equal in value (in lockstep), or the RX_SENS_THRES and CCA_SENS_THRES parameters can be different in value. If at 410 it is determined that the AP is a high density AP (the probe response contained the HD IE), at 414 the clients sets its 3-Tuple parameters to the values in the HD IE; otherwise, at 412 the client uses its default settings.

At 416, the client sends association (or reassociation) request to the AP 104. If at 410 a HD IE was received, the association (or reassociation) request comprises a HD Capable IE as described herein. At 418, the client waits for an association (or reassociation if appropriate) response from the AP. For a HD AP, the association response comprises the HD Tuple IE. It should be noted that because of changes in environmental conditions, the 3-Tuple parameters in the association response HD Tuple IE may not be the same as the 3-Tuple parameters received in the beacon probe response. If the values have changed, the client will use the most recently received values.

After association (assuming the association was successful, e.g., the client was authenticated), the client and AP may exchange HD capability frames. These frame exchanges are unicast and occur between client and AP. At 420, a HD-Capability-Request (from AP to STA) requests client reports its 3-Tuple capability.

AT 422, the client sends a HD-Capability-Report (from STA to AP) that contains the range (high and low) of the 3-Tuple settings that the client is capable of operating within. The client populates the HD-Capability-Report with its supported 3-Tuple range. These parameters indicate the capability of client, not the current setting of client. The HD capability exchange may happen at any time while client is operating in high density mode and is associated to high density AP.

However, the client may change (re-tune) from advertised HD 3-Tuple settings due to self-tuning algorithms intended to improve link performance. For such cases, the HD-STA can report changes in 3-Tuple values, such as if the new values result in higher TX_PWR, lower RX_SENS_THRES, or lower CCA_SENS_THRES. These is changes in 3-Tuple values are reported to the HD-AP by automatically sending a HD-Capability-Report 124 to the associated HD-AP 104. The HD-Capability-Report 124 is sent immediately following the change in 3-tuple settings, at 422.

In addition to or alternatively, after the client has associated with the AP, at 424 the AP may send a Radio Management Request. The Radio Management request may contain a request for one or more of a Beacon Report, a Frame Report, a Channel Load Report, and a Noise Histogram Report.

If radio management request at 424 included a request for a Beacon Report, at 426 the client scans the channels (both on and off serving channel) and summarizes the detected beacon frames and the probe-response frames. The client uses standard IEEE 802.11 default settings (i.e. min RX Sensitivity threshold) for demodulating as many beacon frames and probe-response frames as possible. When performing active off-channel scanning, the client sends out probe-request frame using configured TX power rather than using the TX_PWR in the HD-Tuple IE. After scanning the channels the client sends a Beacon Report to the AP.

If radio management request at 424 included a request for a Frame Report, at 426 the client scans the channel for frames sent to/from a matching target source-address. The client uses standard IEEE 802.11 settings (i.e. min RX Sensitivity Threshold) when conducting this procedure. After scanning the channels, the Frame Report is sent by the client to the AP.

If radio management request at 424 included a request for a Channel Load Report, at 426 the client measures the serving channel for the relative percentage of idle/busy duration. When conducting this procedure, the client uses the CCA_SENS_THRES setting as defined in the HD-Tuple IE sent via a Beacon/Probe Response/Association Response frame from the currently associated AP 104. After measuring the serving channel, the client sends a Channel Load Report to the AP.

If radio management request at 424 included a request for a Noise Histogram Report, at 426 the client identifies the presence of energy below the RX_SENS_THRES sent by the AP for the intended HD-cell size. Therefore, client conducts this procedure using the default RX_SENS_THRES setting representing the default HD-cell size.

FIG. 5 is a block diagram of a method of operation 500 for a High Density Access Point (HD-AP). At 502 the AP receives a probe request frame. The AP examines the probe request frame to determine if the frame has a HD Capable IE as described herein. AT 504, the AP 104 sends a probe response responsive to probe request. If the AP is a HD capable AP and the probe request contained a HD Capable IE, the probe response comprises the HD-Tuple IE as described herein. The HD-Tuple example includes Transmitter Power (TX_PWR) setting, Receiver Sensitivity Threshold (RX_SENS_THRES) setting, and Clear Channel Assessment Sensitivity Threshold (CCA_SENS_THRES) setting. However, alternative embodiments may only send one or two of the group consisting of TX_PWR, RX_SENS_THRES and CCA_SENS_THRES. It should be further noted that the RX_SENS_THRES and CCA_SENS_THRES parameters can be equal in value (in lockstep), or the RX_SENS_THRES and CCA_SENS_THRES parameters can be different in value.

At 506, the AP receives an association (or reassociation) request. The AP examines the association (or reassociation) request to determine if the request includes a HD Capable IE as described herein. At 508, the AP, responsive to association request, sends an association (or reassociation if appropriate) response. If the association request included the HD Capable IE, the association response comprises the HD Tuple IE as described herein. If the association request does not include the HD Capable IE, the AP at its discretion may refuse to associate with the client, or associate with the client in a non-high density mode.

After association, the HD client and HD AP may exchange HD capability frames or radio management reports.

At 512 the AP sends a HD Capability Request to the client. At 514, the client responds with a HD-Capability-Report. The HD Capability Report contains the range (high and low) of the 3-Tuple settings that client is capable of operating within. The client populates the HD-Capability-Report with its supported 3-Tuple range. These parameters indicate the capability of client, not the current setting of client. The HD capability exchange may happen at any time while client 102 (a HD-STA) is associated to AP 104 (a HD AP).

Furthermore, the client may at its discretion change (retune) from advertised HD 3-Tuple settings responsive to self-tuning algorithms intended to improve link performance. For such cases, at 512 the client can report changes in 3-Tuple values, such as if the new values result in higher TX_PWR, lower RX_SENS_THRES, or lower CCA_SENS_THRES to the AP. The AP would receive a HD-Capability Report from the client After a client has associated with the AP, the AP may also (or alternatively) send a Radio Management Request to the client at 514. The Radio Management request suitably comprises a request for one or more of a Beacon Report, a Frame Report, a Channel Load Report, and a Noise Histogram Report. At 516 the AP receives a response from the client with the appropriate report(s).

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims interpreted in accordance with the breadth to which they are fairly, legally and equitably entitled.

The invention claimed is:

1. A method for distributing configuration parameters, comprising:
    receiving a signal from a station;
    determining whether the signal comprise a first information element indicating that the station is capable of adjusting its transmit power setting, receiver sensitivity threshold setting and clear channel assessment threshold setting;
    transmitting a frame comprising a second information element comprising a transmit power setting, a receiver sensitivity threshold setting and a clear channel assessment threshold setting to the station and associating with the station, responsive to determining that the station is capable of adjusting its transmit power setting, receiver sensitivity threshold setting and clear channel assessment threshold setting;
    sending a request to the station for a beacon report comprising data representative of detected beacon frames and probe-response frames detected by the station responsive to determining the signal comprises the first information element; and
    receiving from the station the beacon report.

2. A method according to claim 1 wherein the frame is one of the group consisting of a beacon frame a probe response frame, an association response frame and a re-association response frame.

3. A method according to claim 1, further comprising:
    sending a capability request frame requesting one of the group consisting of the station's transmit power setting, receiver sensitivity threshold setting and clear channel assessment threshold setting; and
    waiting to receive a capability report responsive to the capability request frame that contains the range of one of the group consisting transmit power setting, receiver sensitivity threshold setting and clear channel assessment threshold setting that the station is operating within.

4. A method for determining configuration parameters, comprising:
    sending a probe request frame comprising a first information element indicative of the station being capable of adjusting one of the group consisting of a transmit power setting, receiver sensitivity threshold setting and clear channel assessment threshold setting;
    receiving a probe response frame;
    determining whether the response frame comprises a second information element comprising one of the group consisting of a transmit power setting, a receiver sensitivity threshold setting and a clear channel assessment threshold setting;
    adjusting one of the group consisting of transmit power setting, receiver sensitivity threshold setting and clear channel assessment threshold setting to a value in the second information element responsive to determining the response frame comprises a second information element;

measuring a received signal strength indication of a signal from an access point; and adjusting the receiver sensitivity threshold setting to be greater than the receiver sensitivity threshold to provide a sufficient signal to noise ratio sufficient to support a minimum basic data rate advertised in one of the group consisting of a beacon frame and a probe response frame received from the access point.

5. A method according to claim 4, further comprising adjusting one of the group consisting of transmit power setting, receiver sensitivity threshold setting and clear channel assessment threshold setting responsive to a subsequently received frame, the subsequently received frame is one of the group consisting of a subsequently received beacon frame and a subsequently received probe response frame, the subsequently received frame comprising one of the group consisting of a new transmit power setting, a new receiver sensitivity threshold setting and a new clear channel assessment threshold setting in the probe response frame.

6. A method according to claim 4, further comprising:

changing one of the group consisting of transmit power setting, receiver sensitivity threshold setting and clear channel assessment threshold setting;

and automatically sending a frame responsive to the changing including one of the group consisting of changing the transmit power to a higher value, changing the receiver sensitivity threshold setting to a lower value and changing the clear channel assessment threshold setting to a lower value.

7. An access point, comprising:

a wireless transceiver; and a controller coupled to the wireless transceiver and operable to control the operation of the wireless transceiver;

wherein the controller, responsive to the wireless transceiver receiving a signal from a station, examines the signal to determine whether the signal comprises a first information element indicating that the station is capable of adjusting its transmit power setting, receiver sensitivity threshold setting and clear channel assessment threshold setting;

wherein the controller causes the wireless transceiver to transmit a frame comprising a second information element including a transmit power setting, a receiver sensitivity threshold setting and a clear channel assessment threshold setting to the station, responsive to determining that the station is capable of adjusting its transmit power setting, receiver sensitivity threshold setting and clear channel assessment threshold setting;

wherein the controller is configured to send a request to the station for a frame report comprising data representative of one of a group consisting of frames detected by the station sent from a target address, frames detected by the station sent to a detected address, and frames detected by the station sent to the target address and sent from the target address via the wireless transceiver responsive to determining the signal comprises the first information element; and receiving from the station the frame report via the wireless transceiver.

8. An access point according to claim 7, further comprising the controller changing one of the group consisting of the transmit power setting, the receiver sensitivity threshold setting and the clear channel assessment threshold setting and causing the wireless transceiver to transmit a subsequent frame comprising the one of the group consisting of a new transmit power setting, a new receiver sensitivity threshold setting and a new clear channel assessment threshold setting.

9. An access point according to claim 7, further comprising:

the controller operable to have cause the wireless transceiver to send a capability request frame requesting one of the group consisting of the station's transmit power setting, receiver sensitivity threshold setting and clear channel assessment threshold setting; and the controller waiting for the wireless transceiver to receive a capability report responsive to the capability request frame that contains the range of one of the group consisting transmit power setting, receiver sensitivity threshold setting and clear channel assessment threshold setting that the station is operating within.

10. A wireless station, comprising:

a wireless transceiver, a controller coupled to the wireless transceiver and operable to controlling the operation of the wireless transceiver, the controller configured for sending a probe request frame comprising a first information element indicative of the station being capable of adjusting one of the group consisting of a transmit power setting, receiver sensitivity threshold setting and clear channel assessment threshold setting;

the controller further configured for receiving a probe response frame;

the controller further configured for determining whether the response frame comprises a second information element comprising one of the group consisting of a transmit power setting, a receiver sensitivity threshold setting and a clear channel assessment threshold setting;

the controller further configured for adjusting one of the group consisting of transmit power setting, receiver sensitivity threshold setting and clear channel assessment threshold setting to a value in the second information element responsive to determining the response frame comprises a second information element comprising one of the group consisting of the transmit power setting, the receiver sensitivity threshold setting and the clear channel assessment threshold setting;

wherein the controller is responsive to receiving a request for a noise histogram report is responsive to listen for energy events detected below a default receiver sensitivity threshold settings sent by a device sending the probe response; and the controller is further configured to send data representative of energy events detected below the default receiver sensitivity threshold setting sent by the device sending the probe response to the device sending the probe response.

11. A wireless station according to claim 10, further comprising:

the controller configured to make the wireless transceiver measure a received signal strength indication of a signal from an access point; and adjusting the receiver sensitivity threshold setting to be greater than the receiver sensitivity threshold to provide a sufficient signal to noise ratio sufficient to support a minimum basic data rate advertised in one of the group consisting of a beacon frame and a probe response frame received from the access point.

12. A wireless station according to claim 10, further comprising:

the controller configured to changing one of the group consisting of transmit power setting, receiver sensitivity threshold setting and clear channel assessment threshold setting; and the controller configured to automatically cause the wireless transceiver to send a frame responsive to the changing including one of the group consisting of changing the transmit power to a higher value, changing the receiver sensitivity threshold setting to a lower value and changing the clear channel assessment threshold setting to a lower value.

13. A computer program product having a non-transitory computer readable medium having computer program logic recorded thereon for distributing configuration parameters, and when executed comprising:

means for receiving a signal from a station;

means for examining the signal to determine whether the signal comprises a first information element indicating that the station is capable of adjusting its transmit power setting, receiver sensitivity threshold setting and clear channel assessment threshold setting;

means for transmitting a frame comprising a second information element including a transmit power setting, a receiver sensitivity threshold setting and a clear channel assessment threshold setting to the station, responsive to determining that the station is capable of adjusting its transmit power setting, receiver sensitivity threshold setting and clear channel assessment threshold setting;

means for sending to the station a request for a channel load report requesting data representative of a percentage of time a channel is busy as observed by the station; and means for receiving the channel load report from the station.

14. A computer program product according to claim 13, further comprising:

means for sending a capability request frame requesting one of the group consisting of the station's transmit power setting, receiver sensitivity threshold setting and clear channel assessment threshold setting; and means for waiting to receive a capability report responsive to the capability request frame that contains the range of one of the group consisting transmit power setting, receiver sensitivity threshold setting and clear channel assessment threshold setting that the station is operating within.

15. A computer program product having a non-transitory computer readable medium having computer program logic recorded thereon for determining configuration parameters, when executed comprising:

means for sending a first probe request frame comprising a first information element indicative of the station being capable of adjusting one of the group consisting of a transmit power setting, receiver sensitivity threshold setting and clear channel assessment threshold setting;

means for receiving a first probe response frame from a first responder;

means for sending a second probe request frame comprising a first information element indicative of the station being capable of adjusting one of the group consisting of a transmit power setting, receiver sensitivity threshold setting and clear channel assessment threshold setting;

means for receiving a second probe response frame from a second responder;

means for determining whether the first and second probe response frames comprise a second information element comprising one of the group consisting of a transmit power setting, a receiver sensitivity threshold setting and a clear channel assessment threshold setting;

means for adjusting one of the group consisting of transmit power setting, receiver sensitivity threshold setting and clear channel assessment threshold setting to a value in the second information element responsive to determining the first response frame comprises a second information element comprising one of the group consisting of the transmit power setting, the receiver sensitivity threshold setting and the clear channel assessment threshold setting while associated with the first responder; and means for using default settings responsive to determining the second response frame does not comprise a second information element while associated with the second responder.

16. A computer program product according to claim 15, further comprising means for adjusting one of the group consisting of transmit power setting, receiver sensitivity threshold setting and clear channel assessment threshold setting responsive to a subsequently received frame, the subsequently received frame is one of the group consisting of a subsequently received beacon frame and a subsequently received probe response frame, the subsequently received frame comprising one of the group consisting of a new transmit power setting, a new receiver sensitivity threshold setting and a new clear channel assessment threshold setting in the probe response frame.

17. A computer program product according to claim 15, further comprising:

means for measuring a received signal strength indication of a signal from an access point; and means for adjusting the receiver sensitivity threshold setting to be greater than the receiver sensitivity threshold to provide a sufficient signal to noise ratio sufficient to support a minimum basic data rate advertised in one of the group consisting of a beacon frame and a probe response frame received from the access point.

18. A computer program product according to claim 15, further comprising:

means for changing one of the group consisting of transmit power setting, receiver sensitivity threshold setting and clear channel assessment threshold setting; and means for automatically sending a frame responsive to the changing including one of the group consisting of changing the transmit power to a higher value, changing the receiver sensitivity threshold setting to a lower value and changing the clear channel assessment threshold setting to a lower value.

* * * * *